United States Patent
Liikanen et al.

(10) Patent No.: US 6,985,316 B1
(45) Date of Patent: Jan. 10, 2006

(54) METHOD AND APPARATUS FOR PERFORMING SEEK OPERATIONS IN A DISK DRIVE HAVING A DISK SURFACE WITH SPIRAL SERVO INFORMATION WRITTEN THEREON

(75) Inventors: Bruce Liikanen, Berthoud, CO (US); John VanLaanen, Louisville, CO (US); Bill Ray, Broomfield, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/858,830

(22) Filed: Jun. 2, 2004

Related U.S. Application Data (60) Provisional application No. 60/475,127, filed on Jun. 2, 2003, provisional application No. 60/475,112, filed on Jun. 2, 2003.

(51) Int. Cl.
*G11B 20/06* (2006.01)
*G11B 15/18* (2006.01)
(52) U.S. Cl. .................................. 360/29; 360/69
(58) Field of Classification Search ............. 360/29, 360/69, 75; 369/43, 44.26, 44.34, 53.29
See application file for complete search history.

(56) References Cited

U.S. PATENT DOCUMENTS

| 5,668,679 | A | * | 9/1997 | Swearingen et al. ........... 360/75 |
| 6,144,517 | A | * | 11/2000 | Watanabe et al. ......... 360/77.04 |
| 6,704,156 | B1 | * | 3/2004 | Baker et al. ................ 360/75 |

* cited by examiner

*Primary Examiner*—David Hudspeth
*Assistant Examiner*—Daniell L. Negron
(74) *Attorney, Agent, or Firm*—Tejpal S. Hansra (57) ABSTRACT

The present invention is directed to a method and apparatus for performing seek operations in a disk drive having a disk surface with spiral servo information written thereon. In one embodiment, a disk surface is provided with a read head associated therewith. The disk surface has spiral servo information written thereon. The read head generates a read signal envelope when reading the spiral servo information. A plurality of integration windows is provided. The plurality of integration windows have a standard interval therebetween. A position error signal is generated based upon a location of a read signal envelope within an integration window. The interval between adjacent integration windows is adjusted from the standard interval to generate a position error signal. The read head is moved in a radial direction based upon the position error signal. This process may be repeated to seek across the disk surface.

21 Claims, 9 Drawing Sheets

METHOD AND APPARATUS FOR PERFORMING SEEK OPERATIONS IN A DISK DRIVE HAVING A DISK SURFACE WITH SPIRAL SERVO INFORMATION WRITTEN THEREON

CROSS-REFERENCE TO RELATED APPLICATIONS

Priority is claimed from U.S. Provisional Patent Application Ser. No. 60/475,112 filed Jun. 2, 2003, which is incorporated herein by reference in its entirety. Priority is also claimed from U.S. Provisional Patent Application Ser. No. 60/475,127 filed Jun. 2, 2003, which is also incorporated herein by reference in its entirety.

FIELD OF THE INVENTION

The present invention relates generally to data storage devices, such as disk drives. More particularly, the present invention relates to a method and apparatus for performing seek operations in a disk drive having a disk surface with spiral servo information written thereon.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

Figure 1:
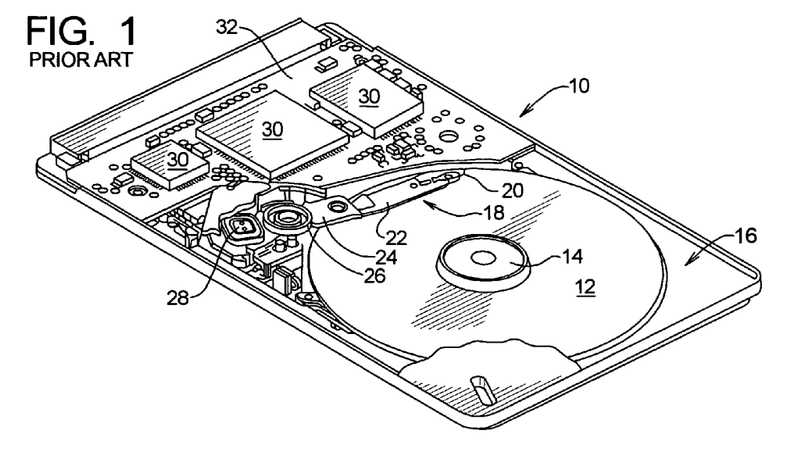
FIG. 1 is a diagrammatic representation illustrating a conventional disk drive with its top cover removed.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Figure 2:
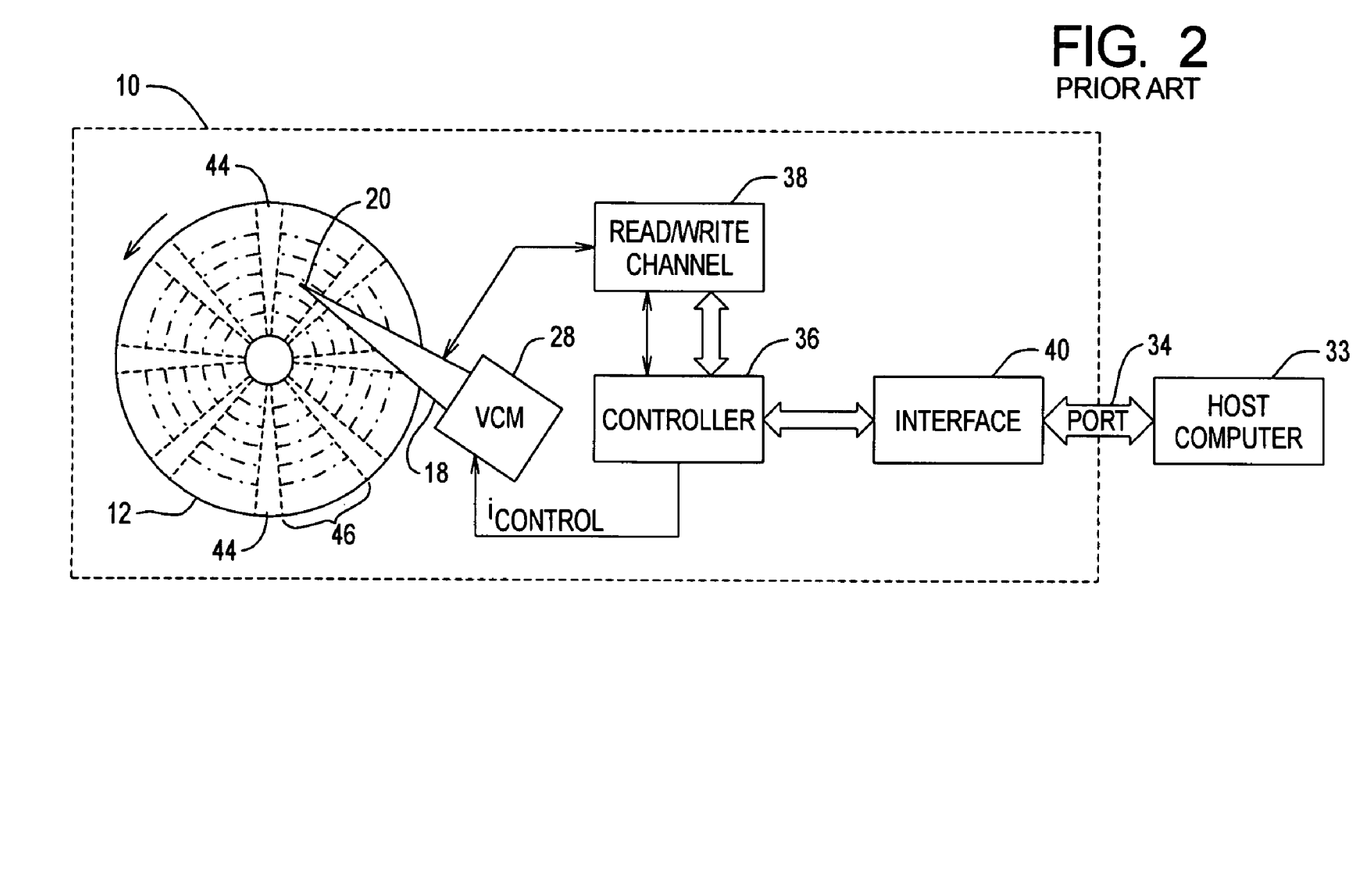
FIG. 2 is a functional block diagram which illustrates a conventional disk drive that is coupled to a host computer via an input/output port.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, I for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

Figures 3, 4:
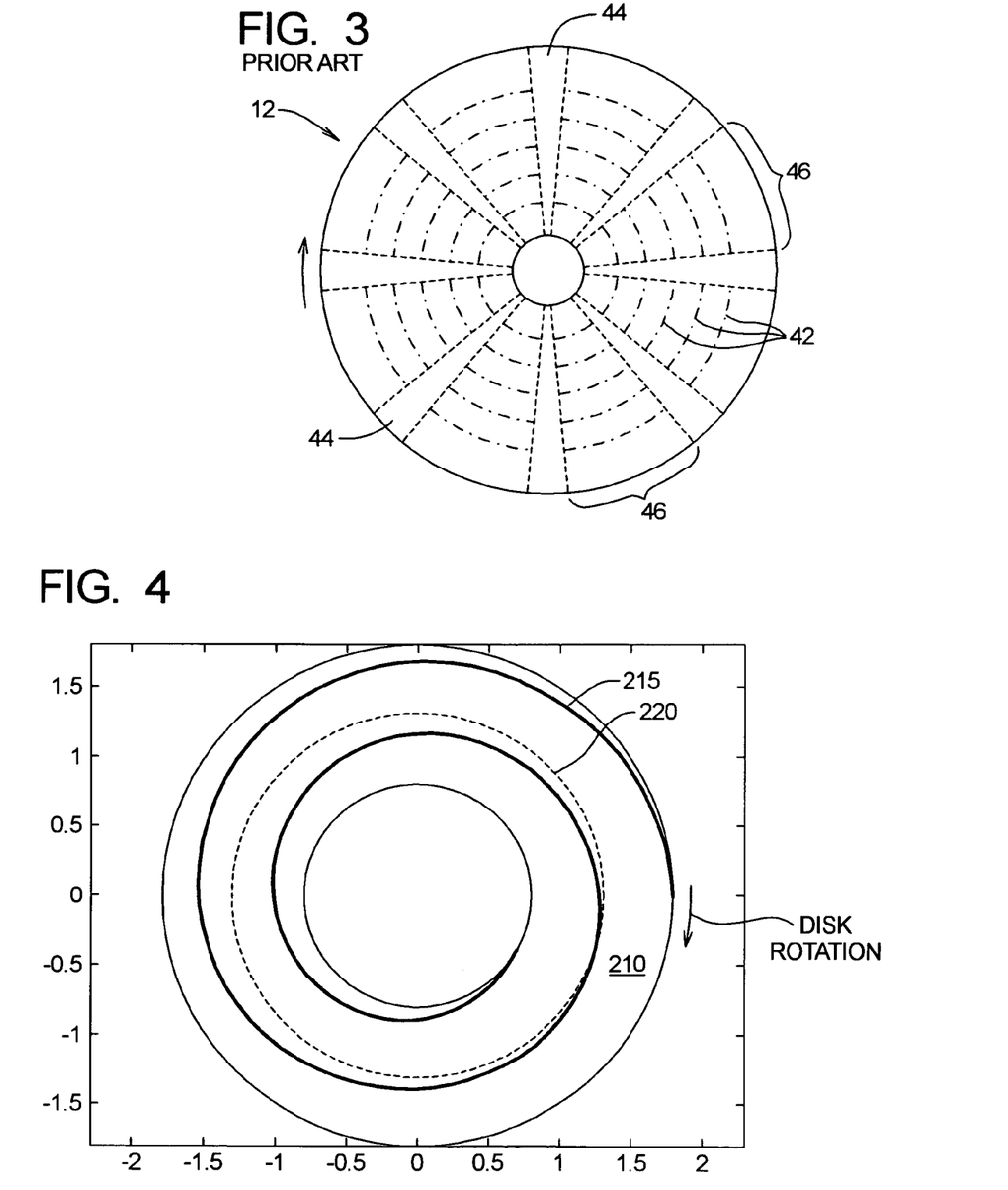
FIG. 3 is a diagrammatic representation of a top view of a magnetic storage disk illustrating a typical organization of data on a disk surface.
FIG. 4 is a diagrammatic representation of a disk surface having a spiral of servo information written thereon, along with a circular data storage track.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

Figure 5:
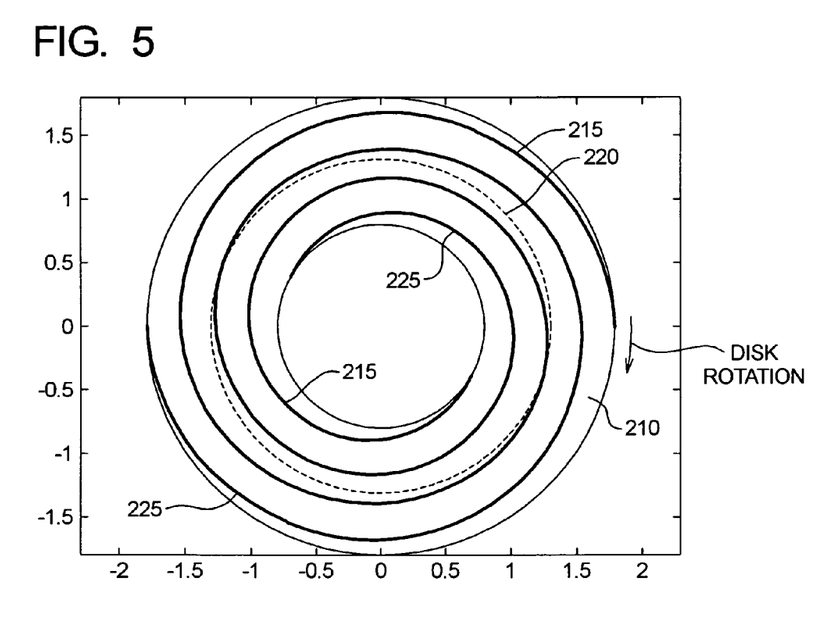
FIG. 5 is a diagrammatic representation of a disk surface having two spirals of servo information written thereon, along with a circular data storage track.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

Figure 6:
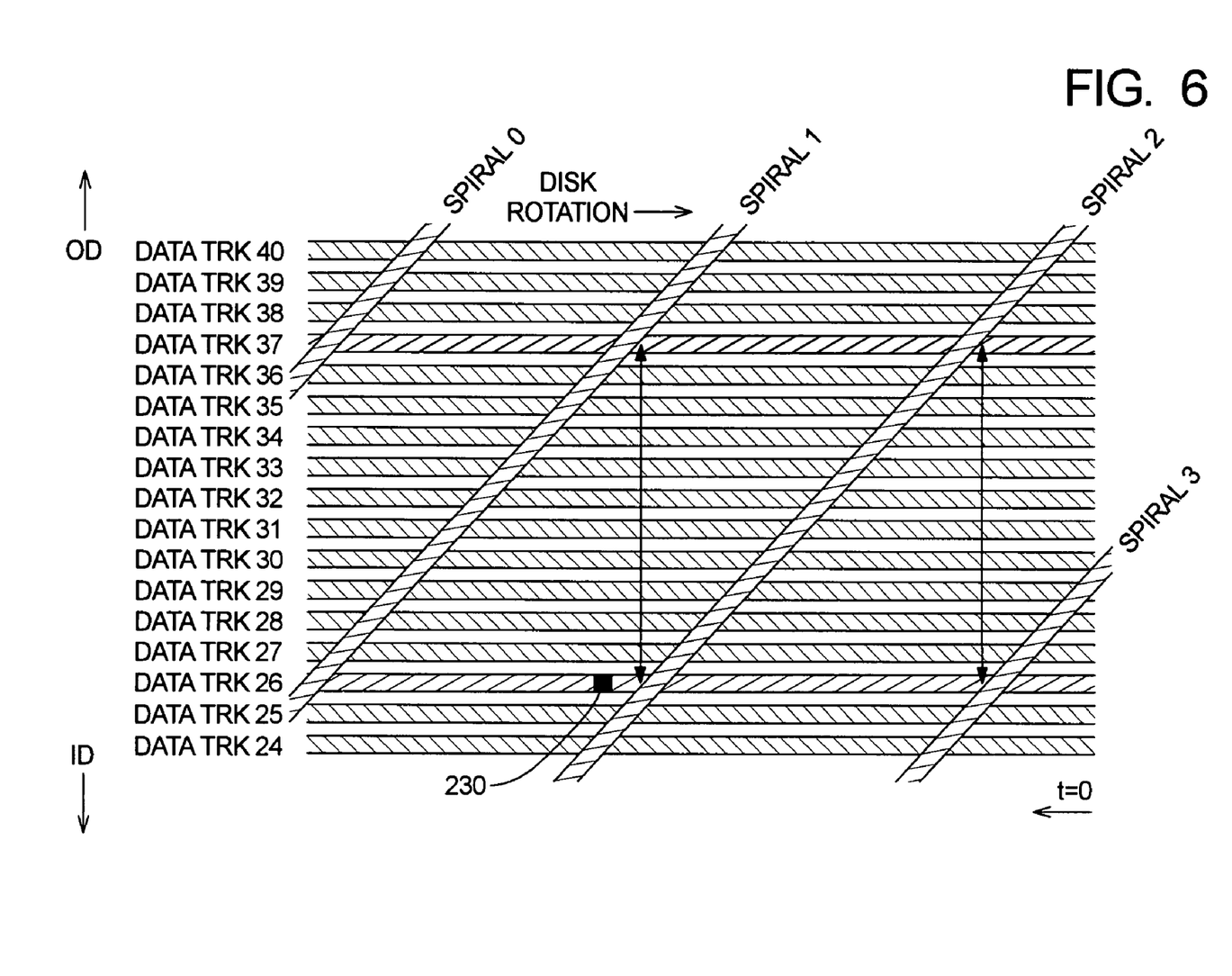
FIG. 6 is a diagrammatic representation of a magnified view of a portion of FIG. 5 showing additional spirals of servo information in a linear, instead of arcuate fashion, for ease of depiction.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24–40 are depicted in FIG. 6), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

Figure 7:
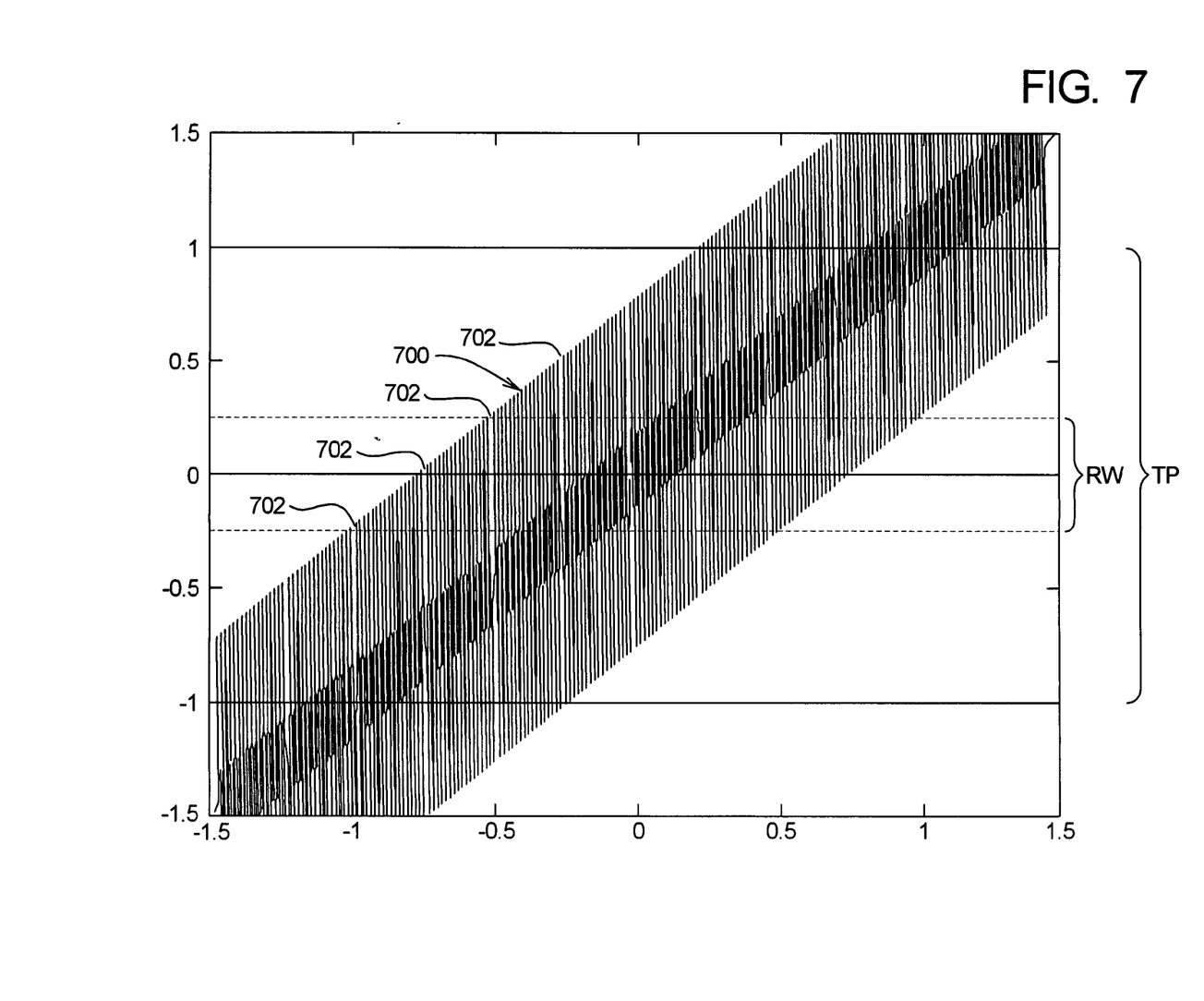
FIG. 7 is a diagrammatic representation of a magnified portion of one of the spirals of servo information shown in FIG. 6.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein.

The sync marks 702 constitute phase shifts within the spiral pattern. In FIG. 7, the sync marks 702 are shown as regularly-space white areas within the spiral 700.

Figure 8:
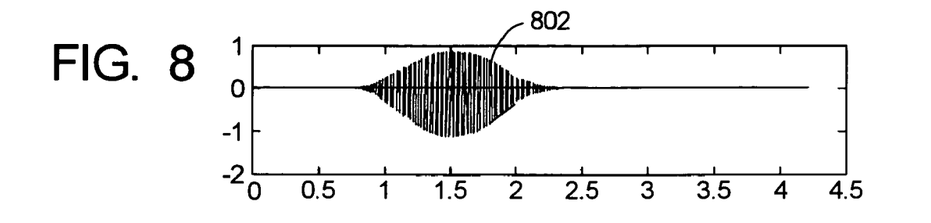
FIG. 8 is a diagrammatic representation of a read signal that is generated as the reader reads a portion of a spiral of servo information while the disk is spinning.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

Figure 9:
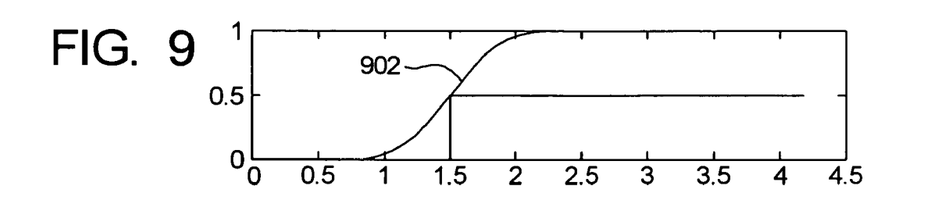
FIG. 9 is a diagrammatic representation of an integration curve in normalized units.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

Figure 10:
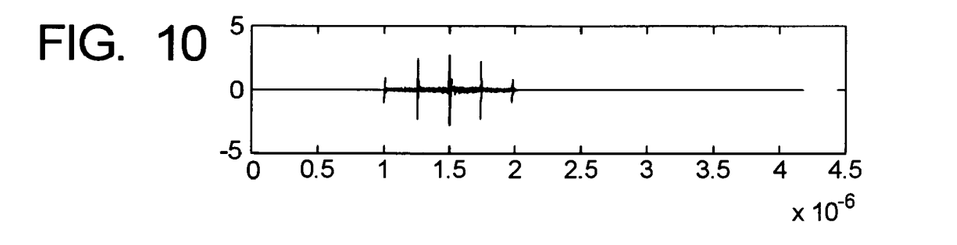
FIG. 10 is a diagrammatic representation illustrating five (5) sync marks in a read signal envelope.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

Figure 11:
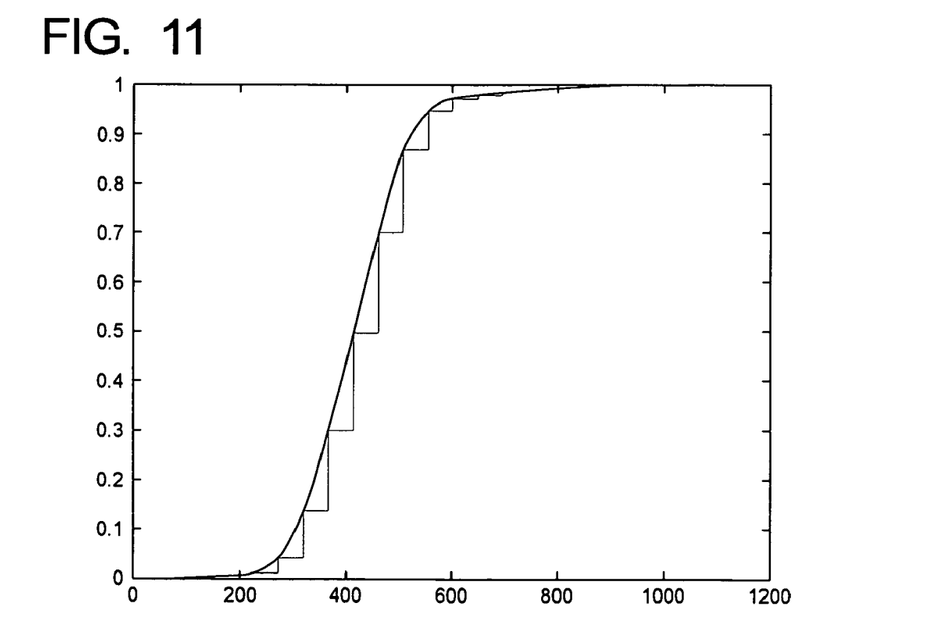
FIG. 11 is a diagrammatic representation of exemplary saved integrator values.

To determine the time at which the half integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync to sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

Figure 12:
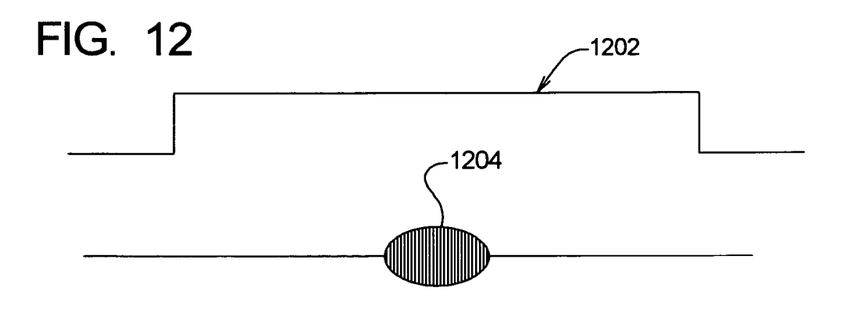
FIG. 12 is a schematic representation of an integration window and a read signal envelope, wherein the read signal envelope is centered in the integration window.

FIG. 12 is a schematic representation of an integration window (or gate) 1202 and a read signal envelope 1204. The integration window 1202 is opened around the expected position of the read signal envelope 1204. In FIG. 12, the read signal envelope 1204 is centered in the integration window 1202. In such case, the position error signal (PES) would be zero.

Figure 13A:
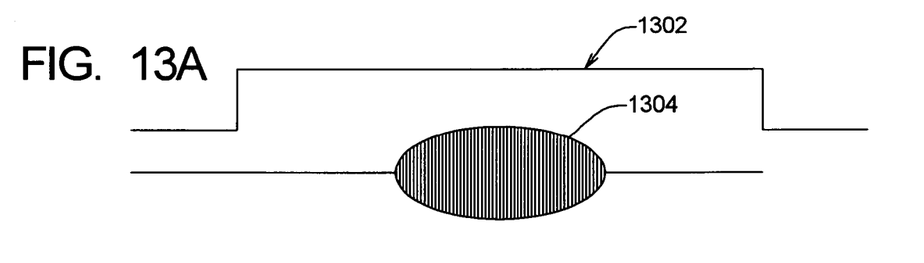
FIG. 13A is a schematic diagram illustrating a read signal envelope that is centered in an integration window.
Figure 13B:
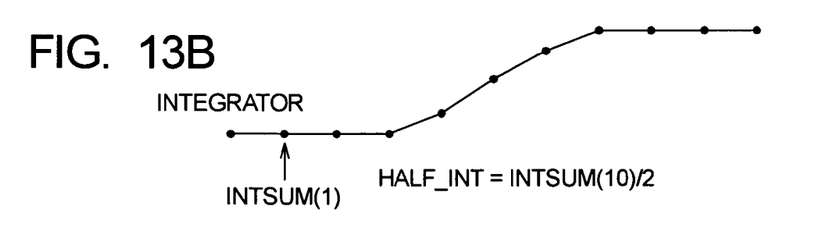
FIG. 13B is a schematic diagram illustrating a curve representing accumulated integration values across the integration window of FIG. 13A.

FIG. 13A is a schematic illustration of a read signal envelope 1304 that is centered in the integration window 1302 (i.e. the PES should be zero). FIG. 13B is a schematic illustration of a curve representing accumulated integration values across the integration window, wherein each dot represents accumulated integration values at a frame.

When a read signal envelope is not centered in the integration window, this is an indication that the read head is not centered relative to the track. Therefore, a PES is generated. The disk drive's servo system moves the read head a distance corresponding to the PES, so that the read head is centered relative to a track.

It would be beneficial to provide a method and apparatus for seeking across the disk surface using the positioning system described above. More specifically, it would be beneficial to move the read head of a disk drive from one radial location to another while positioning on spiral written servo information.

SUMMARY OF THE INVENTION

The present invention is designed to meet some or all of the aforementioned, and other, needs.

The present invention is directed to a method and apparatus for performing seek operations in a disk drive having a disk surface with spiral servo information written thereon. In one embodiment, a disk surface is provided with a read head associated therewith. The disk surface has spiral servo information written thereon. The read head generates a read signal envelope when reading the spiral servo information. A plurality of integration windows is provided. The plurality of integration windows have a standard interval therebetween. A position error signal is generated based upon a location of a read signal envelope within an integration window. The interval between integration windows is adjusted from the standard interval to generate a position error signal. The read head is moved in a radial direction based upon the position error signal. This process may be repeated to seek across the disk surface.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to a method and apparatus for performing seek operations in a disk drive having a disk surface with spiral servo information written thereon. In application, among other things, the present invention may be used in connection with a self-servo writing.

Figure 14:
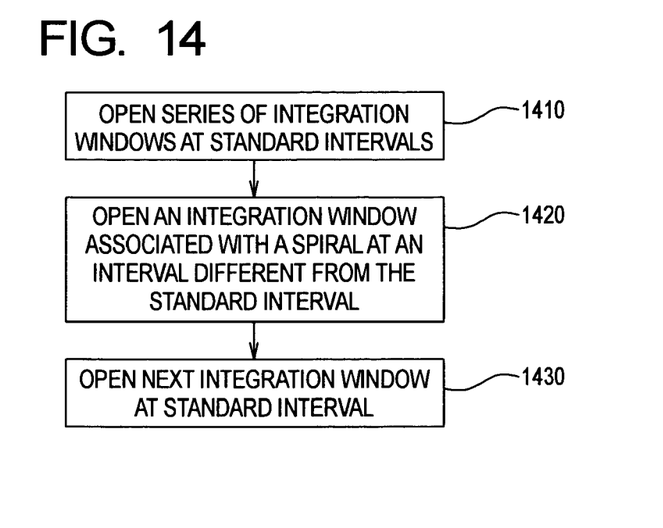
FIG. 14 is flowchart that is used to describe one embodiment of the present invention; and, FIG. 15 is a graph that is used to describe another embodiment of the present invention.

One embodiment of the present invention is described in connection with FIG. 14. A series of integration windows (or gates) are opened at standard intervals of time based upon a known spacing between spirals (step 1410). For clarity, it should be understood that the standard intervals of time relate to a measure of time between adjacent integration windows, not the length of time that each integration window is open. Furthermore, for purposes of illustrating the present invention, it will be assumed that each integration window is opened for a fixed length of time. In one embodiment, the spirals are equidistantly placed on the disk surface and the standard intervals of time correspond to a fixed number of frames.

As described above, when the read signal envelope associated with a spiral appears in the center of the integration window, the PES is zero. To move the head in a radial direction relative to the disk surface, an integration window associated with one spiral is opened at an interval that is different from (i.e., longer than or shorter than) the standard interval (step 1420).

For example, assume that, in one embodiment, one frame of time corresponds to one self-servo write step in radial position. (When self-servo writing, in one situation, the assignee of the present invention currently writes final servo patterns at four self-servo write steps to write one final servo track.) By opening the integration window associated with one spiral at an interval that is one frame longer than (or shorter than) the standard interval, a read signal envelope will be shifted relative to the center of the integration window by one frame. Accordingly, a PES will be generated to move the head a radial distance corresponding with one frame, which in this case corresponds to one self-servo write step, resulting in an incremental seek of one self-servo write step. The direction of the incremental seek will change based upon whether the integration window has been opened at an interval that is longer than or shorter than the standard interval. Assuming the head is not to be moved further, after moving the head, the next integration window is opened at the standard interval (see, e.g., step 1430).

Taking the example further, to perform an incremental seek of two self-servo write steps, the inventors have developed two methods. In a first method, the integration window associated with one spiral is opened at an interval that is two frames longer than (or shorter than) the standard interval. In this case, the read signal envelope will be shifted relative to the center of the integration window by two frames. Accordingly, a PES will be generated to move the head a radial distance corresponding with two frames which, in this example, corresponds to two self-servo write steps. Again, assuming the head is not to be moved further, after moving the head, the next integration window is opened after the standard interval.

Incremental seeks of longer distances are possible using the above-described method. It should be noted, however, that the seek distance will be limited by the length of time that the integration window is opened (e.g., the dynamic range of the integration window).

In a second method, a first integration window associated with a first spiral is opened at an interval that is one frame longer than (or shorter than) the standard interval. A second integration window, which immediately follows the first integration window and which is associated with a second spiral, is opened at an interval that is one frame longer than (or shorter than) the standard interval. In this case, a read signal envelope associated with the first integration window will be shifted relative to the center of the first integration window by one frame, and a PES will be generated to move the head a radial distance corresponding with one frame. Similarly, a read signal envelope associated with the second integration window will be shifted relative to the center of the second integration window by one frame, and a PES will be generated to move the head a radial distance corresponding with another frame. Again, assuming the head is not to be moved further, after moving the head, the next integration window is opened at the standard interval.

An incremental seek performed according to method 1 will have a higher velocity than an incremental seek performed according to method 2. A combination of these methods may be used to performs seeks of various lengths with various velocities.

It should be noted that the interval between integration windows may be made longer or shorter in increments that are different from a frame interval. In such case, the servo system would keep track of the time by which the interval between integration windows has changed relative to the standard interval (e.g., through use of the disk drive's firmware). Using increments based on frames is believed to require less bookkeeping tasks in the firmware.

It should be noted that the present invention may be used in conjunction with a self-servo writing process, whereby the disk drive (without further assistance from the STW) servos on the spiral servo information to write a final servo pattern (e.g., one that looks like the conventional servo pattern of FIG. 3).

Figure 15:
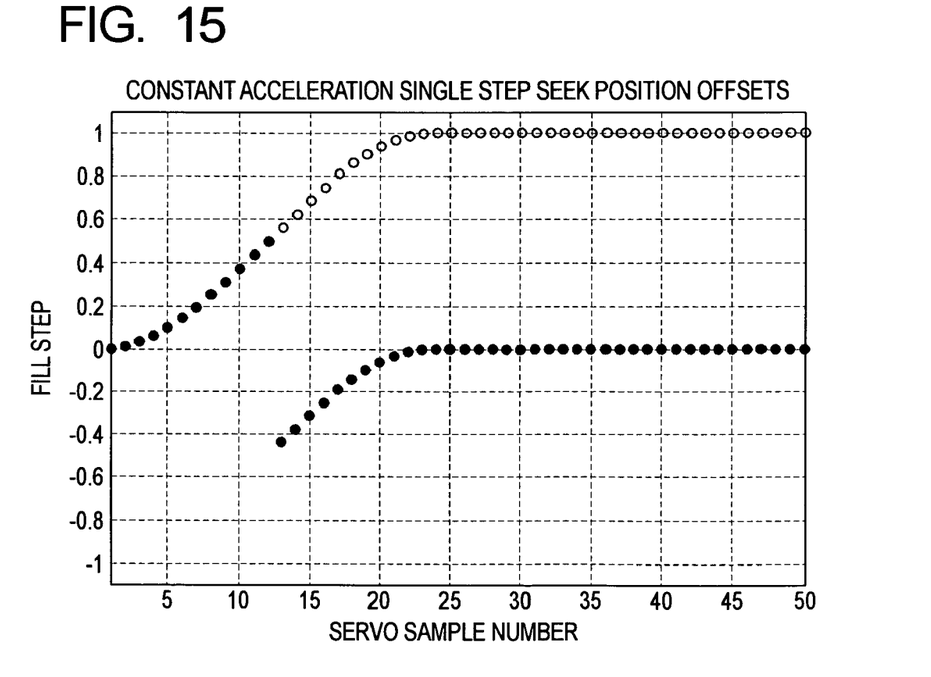

Another embodiment of the present invention is described in connection with FIG. 15. It is believed that the embodiment of the invention described in connection with FIG. 15 is beneficial for performing relatively long seek operations because it permits a head to traverse the disk surface in a relatively short period of time. The embodiment of the invention described in connection with FIG. 15 uses the principles described above.

For purposes of describing this embodiment of the invention, the term "fill step" is equivalent to self-servo write step. The embodiment of the invention described in connection with FIG. 15 uses algorithmically-based sequences of sub-fill step sized position offsets, coupled with appropriately-timed integer frame delays (i.e., intervals between consecutive integration windows that are longer or shorter than the standard interval) that are applied to the positioning system. Consequently, seeks may be performed across the disk surface, wherein the seeks may be characterized by constant acceleration and deceleration.

Position trajectories are created based upon acceleration and deceleration rates of $1/128^{th}$ of a fill step per servo sample time squared. Each fill step is represented with 256 bits. Seeks of an integer number of fill-steps may be performed. In one embodiment, the maximum speed of the seek is one fill step per servo sample.

The lower 8 bits of the position trajectory information defines sequences of sub fill-step sized position offsets that are applied to the positioning system. Changes in the bits above the lower 8 bits of the position trajectory information are used to determine when to change the interval between integration windows on an integer frame basis.

The black dots in FIG. 15 illustrate a sequence of position offsets defined by the lower 8 bits of the position trajectory as they appear in a single fill-step seek. The interval between integration windows is changed by one frame at the point of discontinuity between the sequence of position offsets. The combined affect is to cause the VCM to follow the smooth trajectory identified by the continuous curve containing both black dots and clear circles.

In another embodiment, maximum speeds of both two and three fill steps per servo sample time are permitted by linearly scaling the position trajectories created by the algorithm. This has the side effect of causing available seek distances to be measured in multiples of two and three fill steps, respectively.

It should be understood that acceleration and deceleration rates are not limited to be $1/128^{th}$ of a fill step per servo sample squared. Other rates are possible and anticipated.

It should also be understood that position trajectory scaling may be different from 256 bits per fill step. Furthermore, the trajectory may be linearly scaled by factors other than 1, 2 or 3 to realize other maximum speeds.

It should be understood that the terms "self-servo write step" (or "fill-step") are provided merely as a point of reference and that the present invention may be used without self-servo writing.

It should be understood that the present invention is not limited to the position demodulation system described above and may be equally applicable to other position demodulating techniques. Accordingly, instead of using integration windows, such systems may use gates or the like.

U.S. patent application Ser. No. 10/858,847 entitled "Method And Apparatus For Providing Multi-Point Position Demodulation Of A Read Head When Using Spiral-Written Servo Information" filed on even date herewith is incorporated by reference. U.S. Provisional Patent Application Ser. No. 60/475,049 entitled "Multi-Point Position Demodulation" filed Jun. 2, 2003 (from which the above-identified patent application claims priority) is also incorporated by reference.

U.S. patent application Ser. No. 10/858,839 entitled "Method And Apparatus For Determining A Transducer's Reference Position In A Disk Drive Having A Disk Surface With Spiral Servo Information Written Thereon" filed on even date herewith is incorporated by reference. U.S. Provisional Patent Application Ser. No. 60/475,098 entitled "Virtual Integration Window For Spiral Position Demod" filed Jun. 2, 2003 (from which the above-identified patent application claims priority) is also incorporated by reference.

U.S. patent application Ser. No. 10/858,838 entitled "Method And Apparatus For Dynamic Placement Of An Integration Window In A Disk Drive Having A Disk Surface With Spiral Servo Information Written Thereon" filed on even date herewith is incorporated by reference. U.S. Provisional Patent Application Ser. No. 60/475,050 filed Jun. 2, 2003 is also incorporated by reference. In addition, U.S. Provisional Patent Application Ser. No. 60/475,129 filed Jun. 2, 2003 is incorporated by reference.

It should be understood that the present invention is not limited by the manner in which spiral servo information is written onto the disk surface. Accordingly, the present invention may be used in conjunction with spiral servo information that has been placed on a disk surface using techniques associated with printed media or patterned media processes, among other processes.

It should be understood that present invention may be implemented in firmware or software.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
    providing a disk surface and a read head associated with the disk surface, wherein said disk surface has spiral servo information written thereon and wherein said read head generates a read signal envelope when reading said spiral servo information;
    providing a plurality of integration windows that have a standard interval therebetween, wherein a position error signal is generated based upon a location of a read signal envelope within an integration window;
    generating a position error signal by providing an interval between integration windows that is different from the standard interval.

2. The method of claim 1 further comprising the step of:
    moving said read head in a radial direction based upon said position error signal.

3. The method of claim 1 wherein the interval is different from the standard interval by a frame interval.

4. The method of claim 3 wherein the frame interval corresponds to a self-servo write step in a radial direction.

5. The method of claim 1 wherein the interval is different from the standard interval by more than a frame interval.

6. The method of claim 5 wherein the read head is moved a radial distance that is more than a self-servo step.

7. The method of claim 1 wherein the interval is different from the standard interval by less than a frame interval.

8. The method of claim 7 wherein the read head is moved a radial distance that is less than a self-servo step.

9. The method of claim 1 wherein the interval is different from the standard interval by N frame intervals in order to move the read head N self-servo write steps in the radial direction.

10. The method of claim 9 wherein N equals 2.

11. The method of claim 1 wherein the interval is different between adjacent integration windows.

12. The method of claim 1 wherein the read head moves across the disk surface by providing adjacent integration windows that have an interval that is different from the standard interval.

13. A method comprising the steps of:
    providing a disk surface and a read head associated with the disk surface, wherein said disk surface has spiral servo information written thereon and wherein said read head generates a read signal envelope when reading said spiral servo information;
    providing a first integration window, a second integration window and a third integration window each having a standard interval therebetween, wherein a position error signal is generated based upon a location of a read signal envelope within an integration window;
    generating a position error signal by providing a fourth integration window having an interval between it and the third integration window that is different from the standard interval.

14. The method of claim 13 further comprising the step of:
    moving said read head in a radial direction based upon said position error signal.

15. The method of claim 13 wherein the interval is different from the standard interval by a frame interval.

16. The method of claim 15 wherein the frame interval corresponds to a self-servo write step in a radial direction.

17. The method of claim 13 wherein the interval is different from the standard interval by more than a frame interval.

18. The method of claim 17 wherein the read head is moved a radial distance that is more than a self-servo step.

19. The method of claim 13 wherein the interval is different from the standard interval by less than a frame interval.

20. The method of claim 19 wherein the read head is moved a radial distance that is less than a self-servo step.

21. An apparatus comprising:
    a disk surface and a read head associated with the disk surface, wherein said disk surface has spiral servo information written thereon and wherein said read head generates a read signal envelope when reading said spiral servo information;
    circuitry for providing a plurality of integration windows that have a standard interval therebetween, wherein a position error signal is generated based upon a location of a read signal envelope within an integration window;
    circuitry for generating a position error signal by providing an interval between integration windows that is different from the standard interval.

* * * * *